United States Patent [19]

Otsap et al.

[11] 3,848,585

[45] Nov. 19, 1974

[54] PEAK FLOW INDICATOR FOR FLUIDS

[75] Inventors: Ben Amy Otsap, Encino, Calif.; Eli Neuman, Kiron, Israel

[73] Assignee: Meeda Scientific Instrumentation Limited, Tel Aviv, Israel

[22] Filed: Apr. 5, 1973

[21] Appl. No.: 348,246

[30] Foreign Application Priority Data
Apr. 17, 1972 Israel.................................... 39233

[52] U.S. Cl.................................. 128/2.08, 73/239
[51] Int. Cl............................................. A61b 5/08
[58] Field of Search ............. 128/2.08, 2 C, 2.05 F; 272/57 F; 73/194 R, 205 L, 211, 239, 419

[56] References Cited
UNITED STATES PATENTS

| | | | |
|---|---|---|---|
| 471,389 | 3/1892 | Lacey ................................ | 128/2.08 |
| 1,729,294 | 9/1929 | Newell............................... | 128/2.08 |
| 1,878,917 | 9/1932 | Turner................................ | 73/419 |
| 2,853,880 | 9/1958 | Redding............................. | 73/419 |
| 3,333,844 | 8/1967 | Jurschak........................... | 128/2.08 |
| 3,385,112 | 5/1968 | Pruitt et al........................ | 73/211 |
| 3,720,202 | 3/1973 | Cleary............................... | 128/2.08 |

FOREIGN PATENTS OR APPLICATIONS
1,160,669   8/1969   Great Britain..................... 128/2.08

Primary Examiner—Richard A. Gaudet
Assistant Examiner—Lee S. Cohen
Attorney, Agent, or Firm—Molinare, Allegretti, Newitt & Witcoff

[57] ABSTRACT

A peak flow and/or velocity indicator for testing fluids comprising a body having a cylindrical bore one end of which constitutes the inlet, the other a cylinder in which a piston is slideable. At least one passage leads off from said bore making an acute angle with said cylinder. The outlet of said passage is controlled. An indicator means is lodged in said cylinder is adapted to be moved by said piston. Further means are provided to return said piston and said indicator means to starting position. When fluid flows through said inlet into said body, part of its volume leaves by way of said passage, while part pushes the piston forward in the cylinder, whereby if the latter is suitably calibrated, the peak flow in volume per minute can easily be read.

7 Claims, 3 Drawing Figures

PATENTED NOV 19 1974 3,848,585

PEAK FLOW INDICATOR FOR FLUIDS

The present invention concerns a device for testing the peak flow and/or velocity of fluids, for example the human breath in order to measure the pulmonary activity of patients, speed of air in wind tunnels, peak velocity for meteorological functions and the like purposes.

In a copending patent application there is described and claimed a respirometer comprising a cylindrical body having an intermediate section of fixed internal diameter in the walls of which section two narrow tubes extend radially and in the same diametrical plane, protruding into said section at diametrically opposite sides of the body but off-set to each other in axial directions. A supply of compressed gas is adapted to be connected to the tube which lies nearer the mouthpiece of said body, and the tube more remote from said mouthpiece is in communication with registering means such as a sensitive pressure scale or a cylinder and piston. As gas is released through said tube and when a person blows through said mouthpiece, the deviation caused to the jet by the breath can be measured in terms of the pressure of the gas jet in said opposite tube.

It is the object of the present invention to provide a device which is of simple construction and with which the peak flow and/or velocity of fluid flow can be measured.

The invention consists in a peak flow and/or velocity indicator for fluids, comprising a body having a cylindrical bore, one end constituting the mouthpiece, the other a cylinder for a piston slideable therein, at least one passage leading off from said bore at an acute angle thereto in the direction of said cylinder, the outlet of said passage being controlled, an indicator means being lodged in said cylinder and being adapted to be moved by said piston, means being provided to return said piston and said indicator means to starting position.

In a preferred embodiment of the invention the cylinder and/or mouthpiece are separate parts adapted to be attached to said body in continuation of said bore.

In a further preferred embodiment, the said passage is provided in an integral part of the body which part constitutes a handle for holding the device.

In another embodiment of the invention, the said passage is constituted by inclined apertures provided in the wall of the said body, the outlet from said channels being controlled by a sleeve mounted on the body.

The invention is illustrated, by way of example only, in the accompanying drawings, in which.

Figure 1:
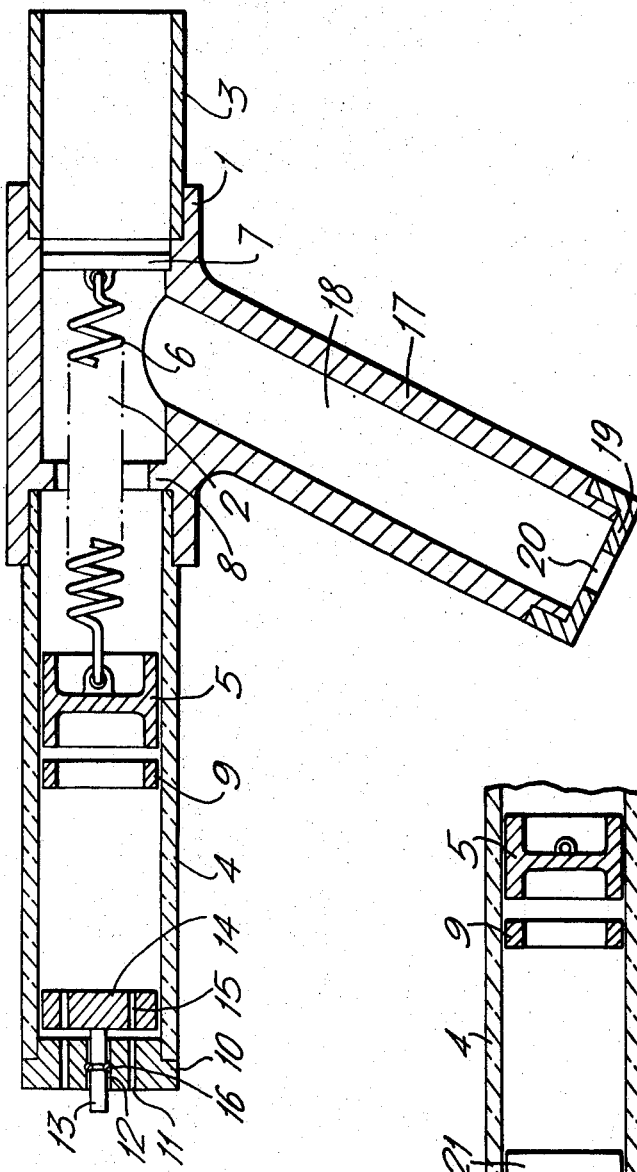
FIG. 1 is a longitudinal section of one embodiment of a peak flow indicator according to the invention.

The peak flow indicating device illustrated in FIG. 1 comprises a body 1 having a substantially cylindrical bore 2. At one end of said bore a cylindrical mouthpiece 3 is attached to the body, held by screwing or friction so that it is interchangeable. At the other end of said bore a cylindrical sleeve 4 is attached to body 1, preferable likewise held by screwing or friction. Sleeve 4 is preferable of transparent or translucent material and constitutes a cylinder in which a piston 5 is slideable against the action of a spring 6 attached on the one hand to said piston and on the other to a narrow attachment member 7 made integral with body 1 and extending across bore 2. The movement of piston 5 with the aid of spring 6, i.e., its backward movement is limited by an internal integral shoulder 8 of body 1.

An indicator ring 9 is lodged within cylinder 4 between piston 5 and the free end of the cylinder. The latter is closed by a cover 10 having through-going exhaust ports 11 and a central bore 12 through which the operating rod 13 of a reset piston 14 extends, the reset piston having through-going ports 15 similar to ports 11 and being lodged in its inoperative position, within cylinder 4 adjacent cover 10. An annular spring catch 16 known per se, disposed in cover 10 engages in a restriction of rod 13 in this position of the piston and prevents its movement unless said rod is positively pushed by an operator.

The body 1 is integral with a handle 17 which extends at an acute angle to the axis of the body in the direction of cylinder 4. A cylindrical bore 18 extends through handle 17 merging with bore 2 on the one hand and being covered by an interchangeable cover 19 having an axially extending aperture 20 which provides a resistance to the free outflow of air from passage 18. The size of aperture 20, i.e., the cover 19 having an aperture 20 of predetermined diameter is mounted on the end of handle 17 in accordance with the force of the breath of the person being tested.

The device works as follows: when the flow of air or of any other fluid is made to enter mouthpiece 3 part of the volume of air entering leaves by way of bore 18 and aperture 20, while the other part pushes the piston 5 forward in cylinder 4 whereby indicator ring 9 is likewise pushed forward. Spring 6 immediately returns piston 5 to its starting position while ring 9 remains. The outside of cylinder 4 is calibrated so that the result of the peak flow in volume per minute can be easily read.

In order to reset ring 9, the rod 13 is pushed inwards so that piston 15 pushes the ring until it abuts against piston 5.

Figure 2:
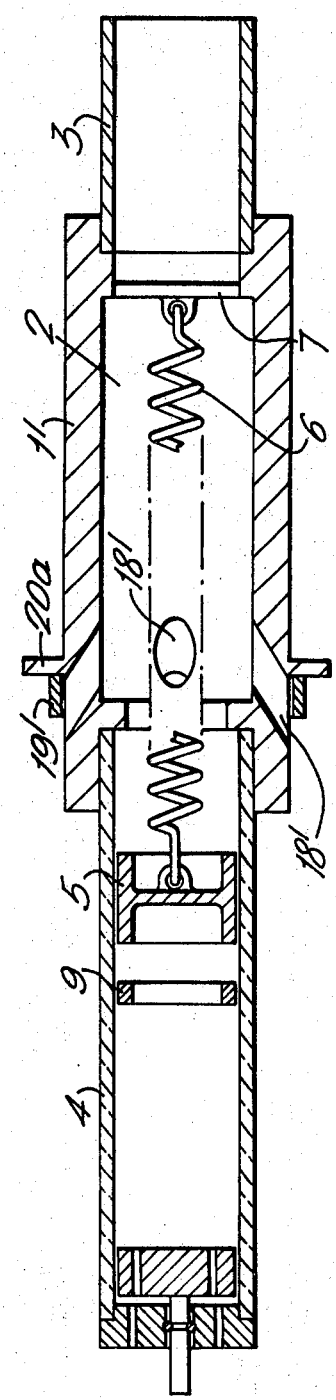
FIG. 2 is a similar view of a second embodiment thereof.

In the embodiment of the invention illustrated in FIG. 2, only the parts different from those of the embodiment of FIG. 1 will be described. Thus body 1' is a straight cylinder having cylindrical bore 2, attached mouthpiece 3 and cylinder 4. Instead of handle 17, and its passage 18, the air passages 18' in this embodiment are made in the wall of body 1' itself and make an acute angle with its axis in the direction of cylinder 4. The outlet of the passages 18' is controlled by means of an inter-changeable sleeve 19' which is slipped onto body 1' and covers partially said outlet, a collar 20a made integral with the body 1' providing an abutment for sleeve 19'. By exchanging the shown sleeve 19 for a longer or shorter one the resistance to the free flow of air through passage 18' is less or more restricted as required. The collar 20a serves also as an abutment for the hand of the user of the device which, in this case is held by holding body 1'.

Figure 3:
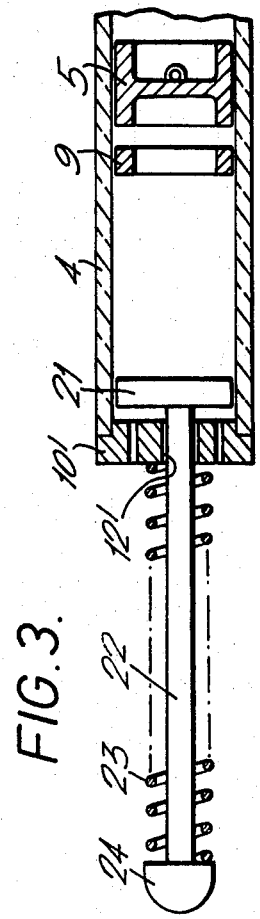
FIG. 3 is a similar view of a second embodiment of a detail thereof.

In FIG. 3 a second embodiment of the means for resetting indicator ring 9 is illustrated. Here a reset plunger 21 lodged in cylinder 4 is provided with a handle 22 which extends through the central bore 12' of the cover 10' to the outside, a spring 23 being mounted on the handle between the cover 10' and a cap 24 fixed to the end of the handle. The spring 23 urges the plunger 21 into its retracted position adjacent cover 10' and its force is overcome by pushing the handle into the cylinder 4 to reset the indicator ring into its starting position adjacent piston 5.

It is within the scope of the present invention to make the indicator ring, or any other indicator means, such as a disc, for example, magnetic, the resetting being effected by a magnet from outside the cylinder. If desired, the cylinder 4 may be made opaque, the indicator means being provided for example with a calibrated rod which extends through the cover so that the calibration can be read thereon. It is also possible, if desired, to make the cylinder 4 and also the adapter 3 as an integral part of the body 1.

We claim:

1. An improved peak flow and/or velocity indicator adapted for testing the human breath in order to measure the pulmonary activity of a patient comprising:
   a body including a cylindrical bore having a first end and a second end;
   a mouthpiece means for use by a patient formed adjacent to the first end of the cylindrical bore and communicating therewith;
   a piston disposed in the cylindrical bore and slidable in the cylindrical bore between a first position adjacent to the first end of the cylindrical bore and a second position adjacent to the second end of the cylindrical bore;
   a spring disposed in the cylindrical bore so as to bias the piston toward its first position;
   at least one passage leading off from said cylindrical bore between the first position and the mouthpiece means and having an outlet therein;
   control means for permitting a predetermined flow of air through the outlet of the passage;
   indicator means disposed in the cylindrical bore between the second end of the cylindrical bore and the piston and slidable in the cylindrical bore, with the indicator means being normally positioned adjacent to and in contact with the piston and being moved by the piston as the piston moves from its first position towards its second position; and
   means for returning the indicator means to its normal position after the indicator means has been moved by the piston, said return means being separate and distinct of said indicator means.

2. The peak flow and/or velocity indicator as claimed in claim 1, wherein a cylindrical member, separable from but normally attached to the body, defines the portion of cylindrical bore between the second end of the cylindrical bore and the first position of the piston; and wherein the mouthpiece means is a mouthpiece that is separable from but normally attached to the body adjacent to the first end of the cylindrical bore.

3. The peak flow and/or velocity indicator as claimed in claim 2, wherein the cylindrical member is of transparent or translucent material and is provided with calibrations on its exterior.

4. The peak flow and/or velocity indicator as claimed in claim 1, wherein the passage is provided in an integral part of the body, which part is designed to be used as a handle for holding the device; and wherein the control means includes a cover, having an aperture of predetermined size therein.

5. The peak flow and/or velocity indicator as claimed in claim 1, wherein the passage comprises a plurality inclined apertures provided in the wall of the body; and wherein the outlet from said apertures is adapted to be covered by a sleeve mounted on the body, with the position of said sleeve relative said apertures controlling flow through the apertures.

6. The peak flow and/or velocity indicator as claimed in claim 1, wherein a cover closes the second end of the cylindrical bore; wherein exhaust port means is disposed in the cover and permits restricted escape of air from the cylindrical bore; and wherein the return means comprising a reset piston having an operating rod extending through the cover.

7. The peak flow and/or velocity indicator as claimed in claim 1, wherein a cover closes the second end of the cylindrical bore; wherein exhaust port means is disposed in the cover and permits restricted escape of air from the cylindrical bore; and wherein the return means comprising a reset plunger whose handle extends through the cover.

* * * * *